Patented July 1, 1930

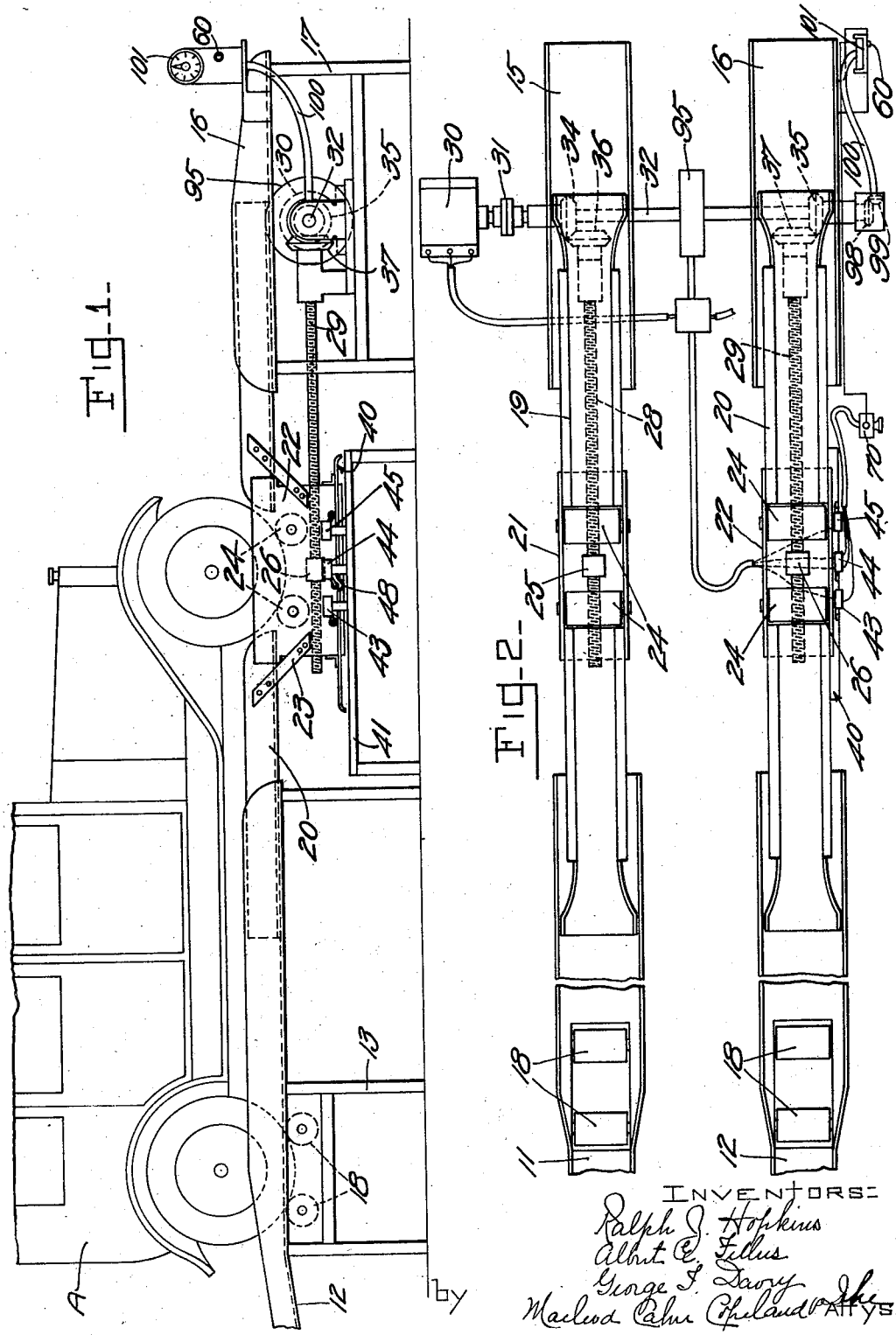

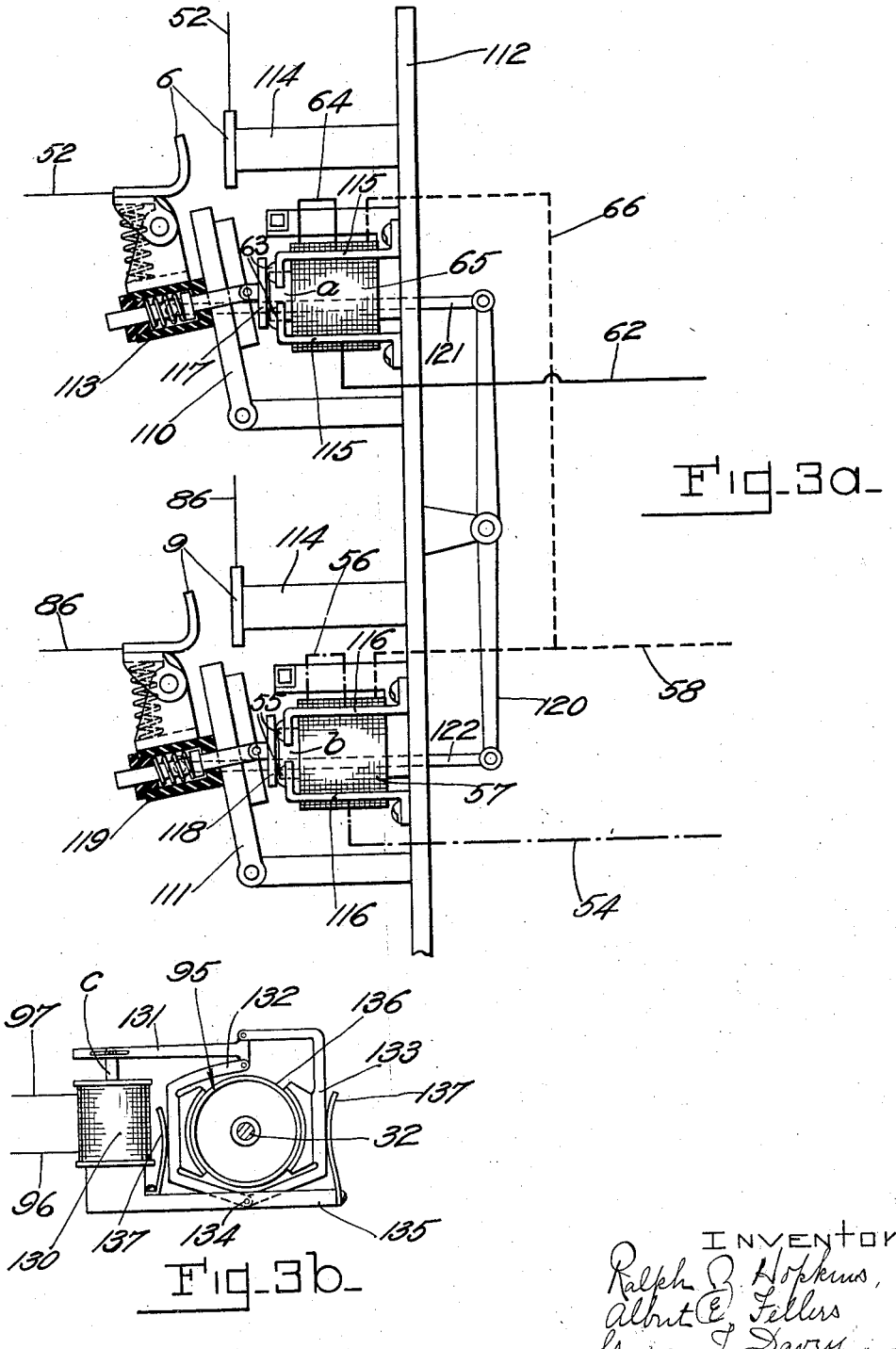

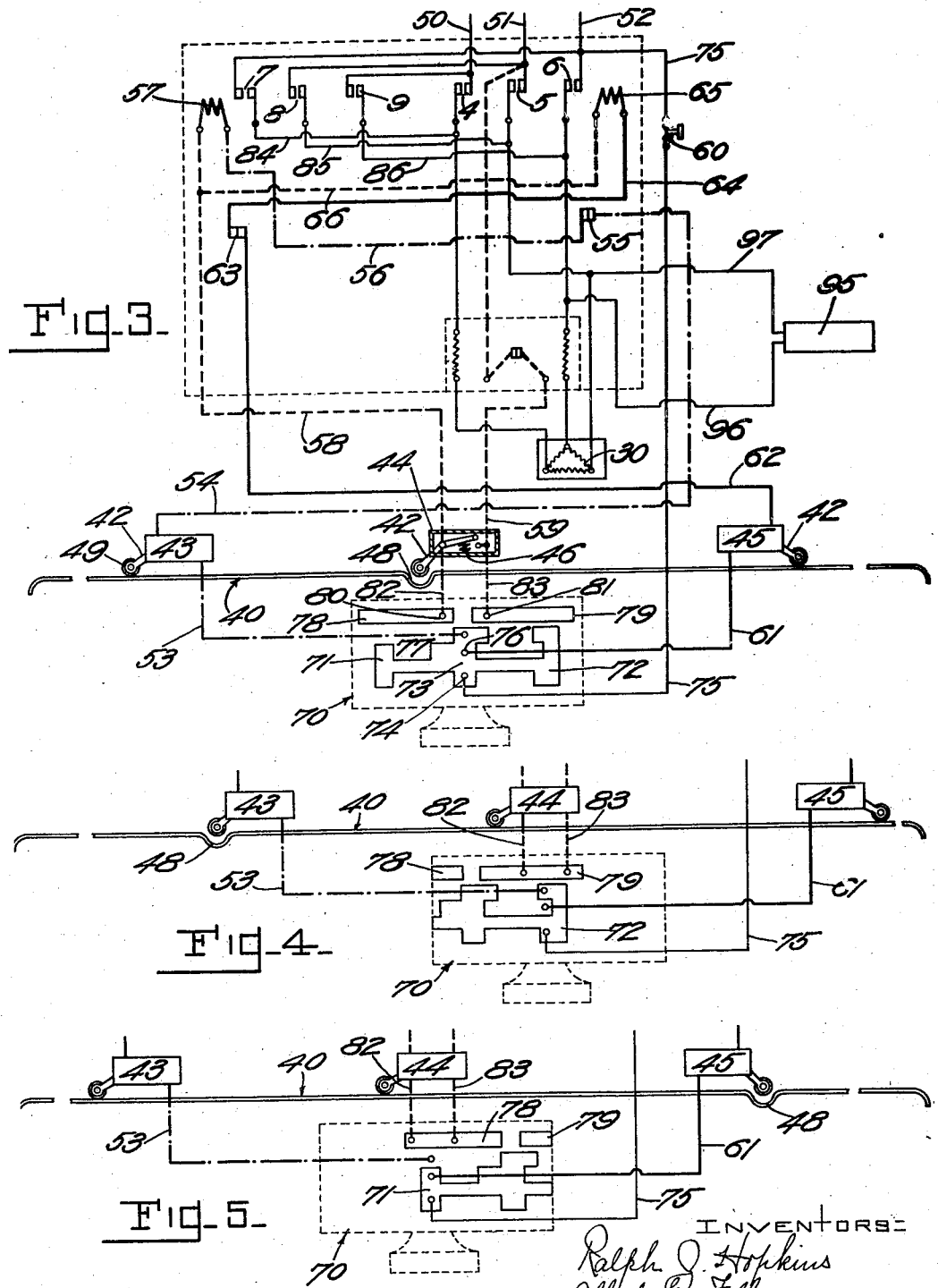

1,769,432

UNITED STATES PATENT OFFICE

RALPH Z. HOPKINS, ALBERT E. FELLERS, AND GEORGE T. DAVEY, OF DETROIT, MICHIGAN, ASSIGNORS TO HUDSON MOTOR CAR COMPANY, OF DETROIT, MICHIGAN, A CORPORATION OF MICHIGAN

BRAKE-TESTING MACHINE

Application filed May 17, 1928. Serial No. 278,573.

This invention relates to devices for testing vehicle brakes and particularly to devices for testing the brakes of automobiles having a brake on each of the four wheels.

In official brake testing stations where the brakes of vehicles having different wheel bases are being tested it is necessary to adjust the testing machine repeatedly to accommodate these different wheel bases. The same is true in the plants of automobile manufacturers producing more than one type of automobile because successive vehicles reaching the test room may have a different wheel base. Heretofore, each adjustment has consumed considerable time and has limited unduly the number of vehicle brakes tested in a given time.

It is an object of the present invention to provide an arrangement for a brake testing device whereby the device may be readily and conveniently adjusted to accommodate vehicles of different wheel bases.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention beyond the terms of the several claims hereto appended or the requirements of the prior art.

The invention will be more clearly understood from the following description in conjunction with the accompanying drawings in which:

Fig. 1 is a side elevation of a brake testing device embodying the invention.

Fig. 2 is a plan view of the same.

Fig. 3 is a diagram showing the relation of the various parts of the device.

Fig. 3ª is a side elevation partly in diagram and partly broken away of one type of reversing switch that may be used with the brake testing device embodying the invention.

Fig. 3ᵇ is a detail view of the magnetic brake.

Figs. 4 and 5 are similar views showing the setting of the device for different wheel bases.

A brake testing device embodying the invention may comprise a pair of elevated parallel runways the rear portions 11 and 12 of which are mounted upon a suitable stationary supporting structure 13 and the front portions 15 and 16 of which are likewise mounted upon a suitable stationary supporting structure 17. The intermediate portions 19 and 20 are supported upon movable carriages 21 and 22 respectively and are suitably secured thereto as by braces 23. Suitable rotors 18 and 24 are rotatably mounted in the rear supporting structure 13 and in carriages 21 and 22 for rotatably supporting the rear and front wheels respectively of a vehicle A. A suitable mechanism for driving the carriages 21 and 22 may comprise threaded blocks 25 and 26 mounted thereon to receive screw shafts 28 and 29 respectively. Shafts 28 and 29 are driven by a motor 30 the armature shaft of which is connected by a coupling 31 to a cross shaft 32 provided with bevelled gears 34 and 35 meshing with bevelled gears 36 and 37 mounted upon the shafts 28 and 29 respectively. A cam 40 is suitably mounted upon one of the travelling carriages and is adapted to control limit switches 43, 44 and 45 which are mounted upon the stationary table 41. Each of said switches is provided with an operating arm 42 normally held closed by the cam but caused to open by a spring 46 when reaching the central depression 48 therein. Preferably, the free end of each arm 42 is provided with a roll 49.

The motor 30 which may be a three phase reversing motor of usual construction is supplied with suitable electrical power from the three feed lines 50, 51 and 52. In accordance with the invention the operation of the motor is controlled to move the carriages 21 and 22 a predetermined desired amount in either direction. With this in view separate circuits are provided for controlling the operation of the motor in opposite directions.

The limit switch 43 is included in a separate circuit indicated by heavy dot and dash lines in Fig. 3 and operatively connected with the motor through leads 53 and 54, contactor 55, lead 56, coil 57 and leads 58 and 59 (see also Fig. 3ª). The limit switch 45 is likewise operatively connected with the motor by a separate circuit indicated by heavy full lines in Fig. 3 and comprising leads 61 and 62, contactor 63, lead 64, coil 65, lead 66 and leads 58 and 59. The leads 58 and 59 form a common portion in each of these separate circuits. The limit switch 44 is interposed between the leads 58 and 59. Each of these circuits may be opened by the spring 46 when the arm 42 of the limit switches 43, 44 or 45 drops in center depression 48 of the cam 40.

A drum switch 70 is provided for suitably connecting these circuits with the feed line and is arranged with suitable contacts 71, 72 and 73 adapted to connect the terminal 74 carrying the lead 75 from the feed line with either the terminal 76 to which the lead 61 is connected, or the terminal 77 to which the lead 53 is connected. The drum switch is also provided with contacts 78 and 79 either of which may connect terminals 80 and 81 carrying leads 82 and 83 from the limit switch 44 and thereby connect the leads 58 and 59 when the limit switch 44 is opened. A switch 60 is provided in the lead 75 from the feed line to the drum switch.

The feed lines 50, 51 and 52 are provided with a set of make and break contactors 4, 5 and 6 which are shunted by circuits 84, 85 and 86 containing another set of make and break contactors 7, 8 and 9. The circuits 84 and 86 connect lines 50 and 52. The contactors 4, 5, and 6 as well as the contactor 63 are controlled by the coil 65 and the contactors 7, 8 and 9 as well as the contactor 55 are controlled by the coil 57.

The contactors 4, 5, 6 and 63 as well as the contactors 7, 8, 9 and 55 are of common construction. As illustrated in Fig. 3ª the operating mechanism for the contactors comprises coils 65 and 57 having armatures 110 and 111 associated therewith respectively pivotally mounted on the frame 112. One member of each pair of contactors 6 and 9 is mounted on a block of insulation 113 and 119 on the armature 110 and 111 respectively. One member of each pair of the other contactors 4 and 5 are likewise carried by the armature 110 and one member of each pair of the contactors 7 and 8 are carried by the armature 111. The other member of each of the contactors 4, 5, 6, 7, 8 and 9 is carried on an insulated block 114 on the frame 112. The contactors 63 and 55 comprise terminals 115—115 and 116—116 forming part of the circuits to the limit switches 45 and 43 respectively and are adapted to be connected or disconnected by the switch members 117 and 118 respectively. These switch members are yieldingly mounted on the blocks 113 and 119 respectively and are adapted to be moved with the armatures 110 and 111. The armatures 110 and 111 are attracted to the cores $a$ and $b$ respectively of the coils 65 and 57 when the latter are energized and are mechanically interlocked by suitable mechanism comprising a lever 120 pivotally mounted on the frame 112. Rods 121 and 122 connect the ends of the lever with the blocks 113 and 119 respectively. It will be apparent that the interlock construction prevents closing of the contactors 4, 5, 6 at the same time as the contactors 7, 8, 9.

A magnetic brake 95 is provided upon the shaft 32 and acts mechanically when deenergized to hold the shaft 32 against movement but is released when power is transmitted through the leads 96 and 97 from the feed line wire 51. A common type of magnetic brake suitable for this purpose comprises (Fig. 3ᵇ) a solenoid 130 the core $c$ of which is pivotally connected to one end of an arm 131, the other end of which is pivotally connected to one end of each of the brake shoes 132 and 133, the other ends of which are pivotally mounted at 134 on the frame 135. A brake drum 136 is mounted on the shaft 32 adapted to cooperate with the shoes 132 and 133. Springs 137 are provided which normally act upon the shoes 132 and 133 to press the same into engagement with the drum. When the solenoid 130 is energized the arm 131 is actuated to move the shoes out of engagement with the drum in opposition to the springs 137.

The shaft 32 may be provided with a bevelled gear 98 adapted to mesh with a bevelled gear 99 upon one end of a flexible shaft 100, the other end of which is operatively connected with a dial 101 for indicating the distance of travel of the carriages 21 and 22. The dial 101 and the switch 60 may, if desired, be mounted together upon a single panel conveniently accessible to the operator.

The arrangement is such that when the drum switch 70 is set as shown in Fig. 4 to connect the line 75 from the feed with the circuit containing the limit switch 43, the motor 30 will be rotated in one direction, whereas if the drum switch is set as shown in Fig. 5 to connect the line 75 with the circuit containing the limit switch 45 the motor will be rotated in the opposite direction. When either of these circuits is energized to move the carriages 21 and 22, the cam 40 mounted thereon is moved relative to each of the limit switches 43, 44 and 45. When the circuit through the limit switch 43 is closed the carriage moves rearwardly until the arm 42 thereof reaches the depression 48 of the cam 40 and is permitted to drop and consequently open the switch and break the circuit.

In a similar manner when the circuit containing the limit switch 45 is energized the carriages 21 and 22 move forwardly until the arm 42 thereof drops into depression 48 of the cam 40 to open the switch. The limit switch 44 limits the movement of the carriages 21 and 22 to an intermediate position, the carriages continuing to travel in either direction until the arm 42 thereof reaches the groove 48 and is permitted to drop and consequently open the switch.

Fig. 3 illustrates the position of the limit switches 43, 44 and 45 relative to the cam 40 when the carriages have been moved to an intermediate position, while Figs. 4 and 5 illustrate the relative position of the limit switches and the cam when the carriages have been moved to the rearward limit and the forward limit respectively. In each of Figs. 3, 4 and 5 the drum switch 70 is shown to connect the circuits so as to move the carriage to the positions above mentioned.

If the carriages are located at an intermediate position and it is desired to move the same to the forward limit, the setting of the drum switch 70 is changed from the position shown in Fig. 3 to that shown in Fig. 5 thereby connecting the line 75 with the circuit containing the limit switch 45. With the drum-switch in this position the circuit through the limit switch 43 is broken and the leads 58 and 59 are connected by contact 78. The switch 60 is then closed thereby permitting power to flow from the feed through the drum switch, lead 61, limit switch 45, lead 62, contactor 63, lead 64, coil 65, lead 66 and return through leads 58 and 59 to the feed line containing the motor.

When this circuit is energized the contactor 55 is held open and the contactors 4, 5 and 6 are closed due to the influence of the holding coil 65, and power is supplied from the feed line to rotate the motor in one direction and thus move the carriage forwardly until the arm 42 of the limit switch 45 drops into depression 48 of the cam 40 to open the circuit and stop the motor. As soon as the circuit is opened the solenoid 130 of the brake 95 is deenergized thus permitting the springs 137 to apply the brake and prevent further movement of the shaft 32. The cam 40 is thus brought to positions relative to the limit switches 43, 44 and 45 as illustrated in Fig. 5.

Likewise, if the carriage is located at the intermediate position and it is desired to move it to its rearward limit the drum switch 70 is changed from the setting shown in Fig. 3 to that shown in Fig. 4, thereby connecting the line 75 with the circuit containing the limit switch 43. When this has been done and the switch 60 has been closed, power will be supplied from the feed through the line 75, the drum switch, lead 53, limit switch 43, lead 54, contactor 55, coil 57 and returned to the feed line through leads 58 and 59, the latter being connected by the contact 79 in the drum switch. When this circuit is energized the contactor 63 is held open and the contactors 7, 8 and 9 closed.

If the carriages 21, 22 are located at their rearward limit and it is desired to move them to an intermediate position the setting of the drum switch 70 is changed from that shown in Fig. 4 to that shown in Fig. 3. The switch 60 is then closed and power is supplied through the line 75, switch 70, lead 61, limit switch 45 and thence through contactor 63, coil 65, and returned to the feed through leads 58, limit switch 44 and lead 59. The carriage will then move forwardly until the groove 48 in the cam 40 reaches the arm 42 of the limit switch 44 and permits the latter to be moved by the spring 46 and thus open the switch and break the circuit.

If the carriages are located at their rear limit and it is desired to move them to the forward limit past the intermediate position, the setting of the drum switch 70 is changed from that shown in Fig. 4 to that shown in Fig. 5. When the drum switch is in this position the contact 78 connects the leads 58 and 59 thereby rendering the limit switch 44 inoperative when the same passes the intermediate position. Likewise, if the carriages are located at the forward limit and it is desired to move them to the rear limit, the drum switch setting is changed from that shown in Fig. 5 to that shown in Fig. 4. Thus, the contactor 79 of the drum switch connects the leads 58 and 59 and renders the limit switch 44 inoperative when it passes the intermediate position.

What we claim is:

1. In an apparatus for testing the brakes of a vehicle, the combination of relatively movable supports for the front and rear wheels of the vehicle, mechanism for shifting one of said supports in opposite directions, means for automatically stopping said shifting mechanism at any one of a plurality of positions, means adjustable to any one of a plurality of positions for starting said mechanism and also for causing said stopping means to operate at one of said positions to stop the travel of said movable support a distance from the other support corresponding to a given wheel base.

2. In an apparatus for testing the brakes of a vehicle, the combination of relatively movable supports for the front and rear wheels of the vehicle, mechanism for shifting one of said supports in opposite directions, means for automatically stopping said mechanism at any one of a plurality of positions, a plurality of devices separately operative for starting said mechanism and also for causing the stopping means to operate automatically at any one of said positions to stop the travel of said movable support a distance from the other support corresponding to a given wheel base.

3. In an apparatus for testing the brakes of a vehicle, the combination of relatively movable supports for the front and rear wheels of the vehicle, power driven mechanism for shifting one of said supports in opposite directions, and means for automatically operating said mechanism to shift said supporting means to any one of a plurality of stationary positions in order to vary the distance between the front and rear wheel supports in accordance with any one of a plurality of wheel bases.

4. In an apparatus for testing the brakes of a vehicle, the combination of relatively movable supports for the front and rear wheels of the vehicle, mechanism for shifting one of said supports, means for driving said mechanism in either direction, and means for rendering said mechanism inoperative at any one of a plurality of predetermined positions of said movable support to vary the distance between said supports in accordance with any one of a plurality of wheel bases.

5. In an apparatus for testing the brakes of a vehicle, the combination of relatively movable supports for the front and rear wheels of the vehicle, driving mechanism for changing the position of one of said supports, and adjustable means for controlling said mechanism to stop said movable support at a given point relative to the other support corresponding to a given wheel base.

6. In an apparatus for testing the brakes of a vehicle, the combination of relatively movable supports for the front and rear wheels of the vehicle, power driven mechanism for moving one of said supports in opposite directions, a control member, a series of stop devices adapted to be selectively actuated by the control member to stop said mechanism, said member and devices being relatively movable, and means adjustable to any one of a plurality of positions for causing said control member to actuate any one of said devices thereby to stop the movable support at a point a distance from the other support corresponding to a given wheel base.

7. In an apparatus for testing the brakes of a vehicle, the combination of relatively movable supports for the front and rear wheels of the vehicle, power driven mechanism for moving one of said supports in opposite directions, a stationary control member, a series of stop devices adapted to be selectively actuated by the control member to stop said mechanism, and means adjustable to any one of a plurality of positions for causing said control member to actuate any one of said devices thereby to stop the movable support at a point a distance from the other support corresponding to a given wheel base.

8. In an apparatus for testing the brakes of a vehicle, the combination of relatively movable supports for the front and rear wheels of the vehicle, mechanism including an electric motor for shifting one of the supports in opposite directions to any one of a plurality of positions corresponding to a given wheel base, a plurality of electrical circuits to the motor, means for completing any one of the electrical circuits for shifting said movable support in a given direction, means for automatically opening said completed circuit to stop the travel of said support a distance from the other support corresponding to a given wheel base.

9. In an apparatus for testing the brakes of a vehicle, the combination of relatively movable supports for the front and rear wheels of the vehicle, mechanism including an electric motor for shifting one of the supports in opposite directions to any one of a plurality of positions corresponding to a given wheel base, a plurality of electrical circuits to the motor, the circuits to the motor having a common portion including a switch for shifting said movable support in a given direction, means for completing any one of the circuits, a cam controlling said switch and adapted to open the same automatically to stop the travel of said support a distance from the other corresponding to a given vehicle wheel base.

10. In an apparatus for testing the brakes of a vehicle, the combination of relatively movable supports for the front and rear wheels of the vehicle, mechanism including an electric motor for shifting one of the supports in opposite directions into any one of a plurality of positions corresponding to a given wheel base, a plurality of separate electrical circuits to the motor including a switch, means for completing any one of the electrical circuits for shifting said movable support in a given direction, means controlling said switch and adapted to open the same automatically to stop the travel of said support a distance from the other corresponding to a given wheel base.

11. In an apparatus for testing the brakes of a vehicle, the combination of relatively movable supports for the front and rear wheels of the vehicle, mechanism including an electric motor for shifting one of the supports in opposite directions into any one of a plurality of positions corresponding to a given wheel base, a plurality of separate electrical circuits to the motor including a switch, means for completing any one of the circuits for shifting said movable support in a given direction, each of said circuits having a common portion including a switch, a cam controlling said switches and adapted to open the same automatically to stop the travel of said support a distance from the other support corresponding to a given vehicle wheel base, said means including a drum switch adapted to render the cam control of the switch in said common portion inoperative.

12. In an apparatus for testing the brakes of a vehicle, the combination of relatively movable supports for the front and rear wheels of the vehicle, mechanism including an electric motor for shifting one of the supports in opposite directions into any one of a plurality of positions corresponding to a given wheel base, a plurality of separate electrical circuits to the motor, means for completing any one of the circuits for shifting said movable support in a given direction, means for automatically opening said completed circuit to stop the travel of said support a distance from the other support corresponding to a wheel base, and means in each of said circuits controlled by one of the others for rendering the circuit inoperative.

13. In an apparatus for testing the brakes of a vehicle, the combination of relatively movable supports for the front and rear wheels of the vehicle, mechanism including an electric motor for shifting one of the supports in opposite directions into any one of a plurality of positions corresponding to a given wheel base, a plurality of separate circuits to the motor, means for completing any one of the circuits for shifting said movable support in a given direction, means for automatically opening said completed circuit to stop the travel of said support a given distance from the other support corresponding to a given wheel base, a brake, and means for rendering said brake inoperative when any one of said circuits is closed.

In testimony whereof we affix our signatures.

RALPH Z. HOPKINS.
ALBERT E. FELLERS.
GEORGE T. DAVEY.